Aug. 17, 1948.　　　　W. S. ADAMS　　　　2,447,385
PISTON RING PACKING
Filed Feb. 22, 1945

WITNESS:
Rob't R. Mitchel.

INVENTOR
William Smiley Adams
BY
Augustus B. Stoughton.
ATTORNEY.

Patented Aug. 17, 1948

2,447,385

UNITED STATES PATENT OFFICE 2,447,385

PISTON RING PACKING

William Smiley Adams, Haverford, Pa.

Application February 22, 1945, Serial No. 579,213

3 Claims. (Cl. 309—45)

The present invention relates to improvements in packing for the pistons of automotive and other high speed internal combustion engines.

Objects of the present invention are: to afford an oil guide control ring freedom of operation; to keep oil holes in the piston open and free from obstruction; to improve the operation of the device; to insure faster oil drain and the presence of cleaner cylinder walls; to reduce machining and cost; to improve the operation of the engine to substantially eliminate piston drag; to obtain the advantages of a wide channel without loss of control of the oil; to provide a separate groove for each oil ring, whereby the oil holes remain open for a comparatively long time and the rings continue to function for a comparatively long time; to avoid breakage in operation due to repeated or complicated machining of the rings; to simplify the installation of the ring; to keep the oil holes clear of sludge; to obtain the advantage of a wide oil ring without loss of oil control due to the wide ring being carried off the cylinder wall by slap-rock; to provide for the use of ordinary cast iron stock ring material; to provide for uniform operation of the three independent members; and, generally, to provide efficient piston packing lubrication and operation.

Generally stated, the invention comprises three grooves in the exterior of the piston of which the middle one is comparatively narrow and has holes through the piston wall, the holes having enlarged portions communicating with the adjacent two grooves, piston rings in the outside groove, and a ring in the middle groove having teeth on its inner edge which extend through the smaller holes in the middle groove.

The invention also comprises the improvements to be presently described and finally claimed.

In the following description, reference will be made to the accompanying drawing forming part hereof and in which.

Figure 1:
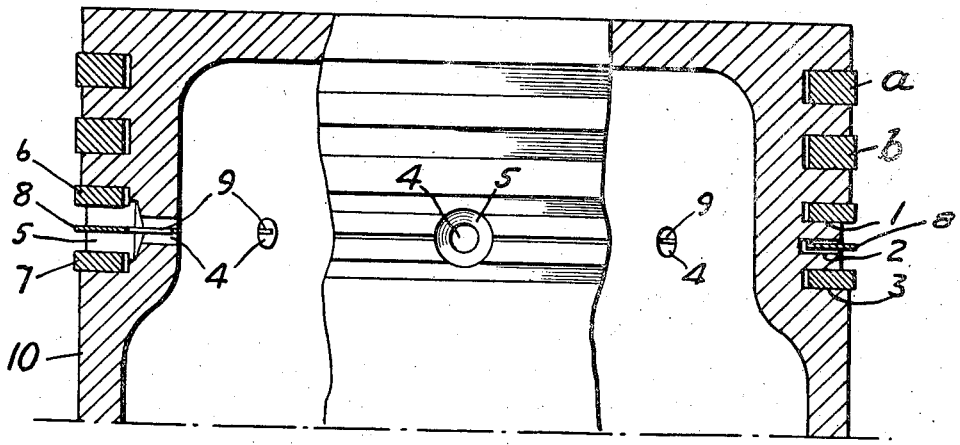
Fig. 1 is an elevational view partly in section of a portion of a piston embodying features of the invention.

Referring to the drawing, a and b indicate the the usual piston rings. 10 indicates a portion of a generally cylindrical piston of an automotive or other high speed internal combustion engine. Externally the piston is provided with three circumferential grooves 1, 2 and 3 of which the outer grooves 1 and 3 are provided with piston rings, and of which the middle groove 2 is, or may be, comparatively narrow. Between the grooves 1 and 3, a belt or zone of the piston is of slightly reduced diameter. Extending from the middle groove 2 radially toward the center of the piston are spaced holes or openings 4. Toward the circumference of the piston, the holes or openings 4 are enlarged as at 5 so as to communicate with the outer grooves 1 and 3. 6 and 7 are piston rings arranged in the grooves 1 and 3. 8 is a ring arranged in the middle groove and it is provided with teeth 9 extending radially inward and located in the holes 4 extending through the piston wall.

Figure 3:
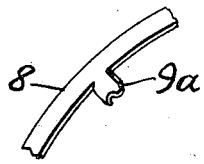
Fig. 3 is a fragmentary perspective view illustrating a modification of the teeth shown in Fig. 2.

In use, the teeth or projections 9 operate to keep the holes in which they are arranged open so that oil may pass freely from the internal surface of the cylinder to the internal surface of the piston and in that way the parts are well lubricated and smoothness in operation and long wear and life are insured. The teeth 9, as well as the ring 8, may be flat and constructed of comparatively thin material. In the modification shown in Fig. 3, the teeth 9a are shown as somewhat twisted or warped.

Figure 4:
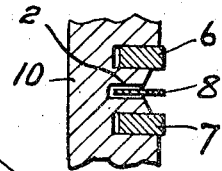
Fig. 4 is a sectional view illustrating a modification of the construction shown in Fig. 1.
Figure 2:
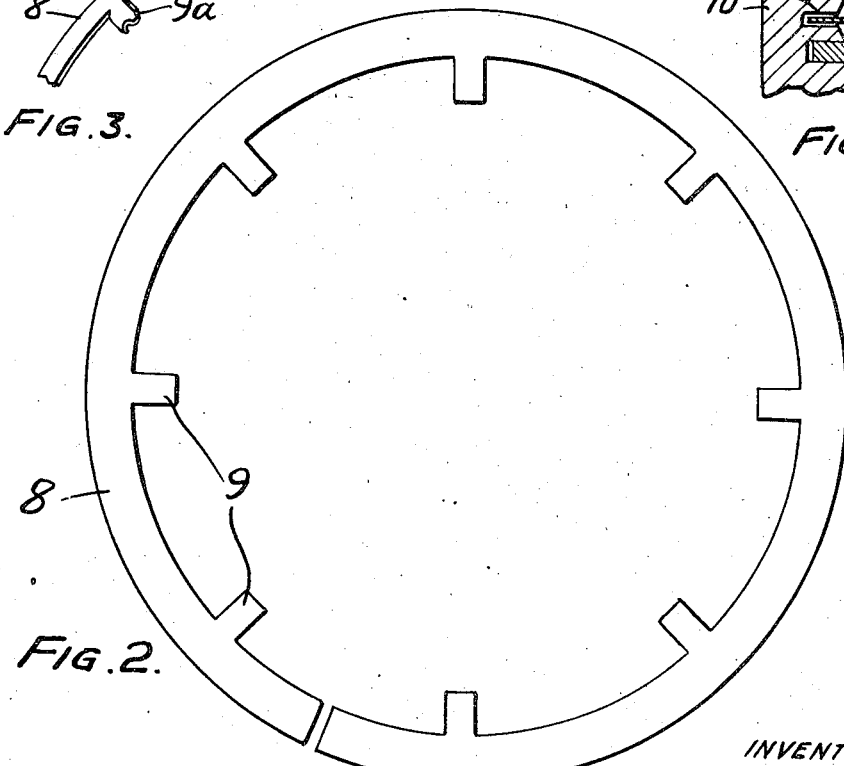
Fig. 2 is a top or plan view of one of the rings shown in Fig. 1 and provided with centrally projecting teeth or projections.

If desired, the annular belt or zone of the piston surface extending between the rings 7 and 8 may be of concaved form instead of cylindrical form as shown in Figure 1, such modification being shown in Figure 4 wherein said annular belt or zone of the piston surface is shown as being of generally V-shaped form in cross-section.

It will be obvious to those skilled in the art to which the invention relates that modifications may be made in details of construction and arrangement and in matters of mere form without departing from the spirit of the invention.

I claim:

1. A piston ring assembly comprising, in combination, a hollow piston having a main pair of axially spaced annular grooves formed in its external wall and an intermediate annular groove located centrally between said main pair of grooves, said intermediate groove being of relatively narrow width as compared with the width of each of said main pair of grooves, said piston being provided in the wall thereof with a plurality of circumferentially spaced openings disposed with their axes in the plane of said intermediate groove, said openings being each enlarged at its outer extremity to a diameter exceeding the spacing between said pair of grooves whereby to present the latter in communication with the interior of said piston and with said intermediate groove by way of said openings, and split piston rings respectively seated in said grooves, the ring seated in the intermediate groove having a comparatively loose fit therein for constrained floating movement centrally between the rings respectively fitted within said main pair of grooves.

2. In a piston ring assembly of the character defined in claim 1 wherein said intermediate ring is provided with inwardly projecting circumferentially spaced elements adapted respectively for loose fit in the inner reduced diameter portions of said openings.

3. A piston ring assembly comprising, in combination, a hollow piston having formed in the external wall thereof a piston ring groove set including at least a pair of annular grooves arranged in parallel, axially spaced relation, said piston being additionally provided with a plurality of circumferentially spaced oil drainage openings extending radially through the wall of the piston and disposed with their axes in a common plane located between said axially spaced pair of grooves, said openings being respectively enlarged at their outer extremities to a diameter exceeding the spacing between said pair of grooves whereby to present the latter in communication with each other and with the interior of said piston by way of said oil drainage openings, and piston rings respectively seated in said pair of grooves, said rings being operative in association with said openings to return excess oil directly from the bottoms of said grooves to the interior of the piston upon movement of the latter in either direction.

WILLIAM SMILEY ADAMS.

REFERENCES CITED

The following references are of record in the file of this patent:

UNITED STATES PATENTS

| Number | Name | Date |
|---|---|---|
| 1,342,380 | Hachmann | June 1, 1920 |
| 1,466,510 | Miller | Aug. 28, 1923 |
| 2,034,770 | Porter | Mar. 24, 1936 |
| 2,244,166 | Marien | June 3, 1941 |
| 2,273,703 | Gille | Feb. 17, 1942 |